(12) United States Patent  
Tate et al.

(10) Patent No.: US 7,520,346 B2
(45) Date of Patent: Apr. 21, 2009

(54) HYDRAULIC POWER UNIT

(75) Inventors: Jeremy John Tate, Beatrice, NE (US); Xingen Dong, Farmington, CT (US); Steven Clark Finker, Adams, NE (US)

(73) Assignees: Parker-Hannifin Corporation, Cleveland, OH (US); The Toro Company, Bloomington, MN (US)

( * ) Notice: Subject to any disclaimer, the term of this patent is extended or adjusted under 35 U.S.C. 154(b) by 215 days.

(21) Appl. No.: 11/551,524

(22) Filed: Oct. 20, 2006

(65) Prior Publication Data

US 2007/0102223 A1 May 10, 2007

Related U.S. Application Data

(60) Provisional application No. 60/728,927, filed on Oct. 20, 2005.

(51) Int. Cl.
*B60K 17/00* (2006.01)
(52) U.S. Cl. .................... 180/6.48; 180/53.4; 180/197; 180/305
(58) Field of Classification Search ............... 180/6.48, 180/53.4, 197, 305
See application file for complete search history.

(56) References Cited

U.S. PATENT DOCUMENTS

| | | | |
|---|---|---|---|
| 4,373,600 A * | 2/1983 | Buschbom et al. ........... 180/212 |
| 4,666,091 A * | 5/1987 | von der Heide ....... 241/101.742 |
| 5,203,169 A | 4/1993 | Ishii et al. |
| 5,910,060 A * | 6/1999 | Blume .......................... 475/28 |
| 6,276,840 B1 * | 8/2001 | Weiss et al. ................... 385/59 |
| 6,425,244 B1 | 7/2002 | Ohashi et al. |
| 6,592,290 B2 * | 7/2003 | Jaszkowiak ................. 404/112 |
| 6,672,843 B1 | 1/2004 | Holder et al. |
| 6,799,346 B2 * | 10/2004 | Jeng et al. ...................... 15/28 |
| 6,843,056 B1 | 1/2005 | Langenfeld et al. |
| 6,953,327 B1 | 10/2005 | Hauser et al. |
| 6,988,580 B2 * | 1/2006 | Ohashi et al. ................ 180/307 |
| 7,056,101 B1 * | 6/2006 | Hauser et al. ................ 417/269 |
| 7,082,759 B1 * | 8/2006 | Tsukamoto et al. ........... 60/456 |
| 7,137,250 B1 * | 11/2006 | McCoy et al. .................. 60/486 |
| 7,309,301 B2 * | 12/2007 | Janson et al. ............... 475/200 |
| 7,316,287 B2 * | 1/2008 | Ohashi et al. ............... 180/307 |
| 7,370,714 B2 * | 5/2008 | Yasuda et al. ............... 180/53.4 |
| 7,392,654 B1 * | 7/2008 | Hauser et al. .................. 60/484 |
| 7,455,132 B2 * | 11/2008 | Acharya et al. ............. 180/53.4 |
| 7,455,144 B2 * | 11/2008 | Ohashi et al. ............... 180/242 |
| 2006/0039801 A1 | 2/2006 | Dong et al. |

FOREIGN PATENT DOCUMENTS

EP 69369 A1 * 1/1983

* cited by examiner

*Primary Examiner*—Paul N Dickson
*Assistant Examiner*—Patrick Centolanzi
(74) *Attorney, Agent, or Firm*—Renner, Otto, Boisselle & Sklar, LLP (57) ABSTRACT

A compact dual hydraulic pump unit having a low profile configuration. The inlet and outlet ports of the pumps may be located on opposite transverse sides of the unit for easy connection to adjacent motors coupled to the drive wheels of a vehicle.

15 Claims, 7 Drawing Sheets

HYDRAULIC POWER UNIT

RELATED APPLICATIONS

This application claims the benefit of U.S. Provisional Application No. 60/728,927 filed Oct. 20, 2005, which is hereby incorporated by reference.

FIELD OF THE INVENTION

The present invention relates generally to hydraulic power units. More particularly, the invention relates to hydraulic pumps for use in vehicles, such as mowing machines.

BACKGROUND OF THE INVENTION

Hydrostatic transmissions have many uses, including the propelling of vehicles, such as mowing machines, and offer a stepless control of the machine's speed. A typical hydrostatic transmission system includes a variable displacement main hydraulic pump connected in a closed hydraulic circuit with a fixed displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral. For most applications, the pump is driven by a prime mover, such as an internal combustion engine or an electrical motor, at a certain speed in a certain direction. Changing the displacement of the main pump will change its output flow rate, which controls the speed of the motor. Pump outflow can be reversed, thus reversing the direction of the motor. In a vehicle, the motor is typically connected through suitable gearing to the vehicle's wheels or tracks.

In some vehicles, such as zero-turn-radius mowers, separate hydraulic pumps and motors are used to independently drive separate wheels of an axle. By independently driving the wheels in opposite directions, for example, the vehicle can be made to turn with zero radius. Zero-turn-radius mowers are increasingly popular as the size and costs of such mowers decrease. As the size of the mowers decreases, however, the space available for the hydraulic components and/or prime mover also decreases.

SUMMARY OF THE INVENTION

The present invention provides a compact dual hydraulic pump unit having a low profile configuration. The inlet and outlet ports of the pumps may be located on opposite transverse sides of the unit for easy connection to adjacent motors coupled to the drive wheels of a vehicle.

Accordingly, a hydraulic pump unit for a vehicle comprises a housing, and first and second hydraulic pump assemblies located within the housing and each having a rotatable pump shaft and fluid pumping components driven upon rotation of the pump shaft to pump fluid from a first port to a second port. An input drive shaft is mounted in the housing apart from the pump shaft of each pump assembly, and transmission components drivingly connect the input shaft to the pump shafts whereupon rotation of the input drive shaft effects rotation of the pump shafts.

The rotational axis of the input drive shaft is preferably perpendicular to the rotational axes of the pump shafts. The transmission components may include drive components for driving the pump shaft of one pump off the pump shaft of the other pump, and the other pump shaft off the input drive shaft. Shafts of the pump assemblies preferably are parallel to one another and transversely spaced apart, and the first and second ports for each pump assembly can be located at opposite transverse sides of the housing.

A height dimension of a portion of the housing surrounding the fluid pumping components of the pump assembly preferably does not exceed a radial dimension of the fluid pumping components by more than 50 percent, more preferably not more than 35 percent, and still more preferably not more than 25 percent. The height dimension of the housing, for example, may be no greater than six inches.

A vehicle is also provided having a frame having a longitudinal axis and wheels supporting the frame for movement over the ground. A dual hydraulic pump unit is mounted to the frame with the rotational axes of the pump shafts substantially parallel to the longitudinal axis of the frame. The pump shafts of the hydraulic pump unit can be parallel to one another and transversely spaced apart, and first and second ports for each pump assembly can be located at opposite transverse sides of a housing of the pump unit for connection to respective hydraulic motors on transverse opposing sides of the vehicle for independently driving the wheels of the vehicle. The first and second ports for each pump assembly can be located on respective opposite transverse sides of the vehicle and arranged in a vertical configuration wherein one port is higher than the other port on each respective side. A fan for circulating air around the hydraulic unit can be located between the hydraulic unit and an engine mounted to the vehicle.

Further features of the invention will become apparent from the following detailed description when considered in conjunction with the drawings.

DETAILED DESCRIPTION

Figure 1:
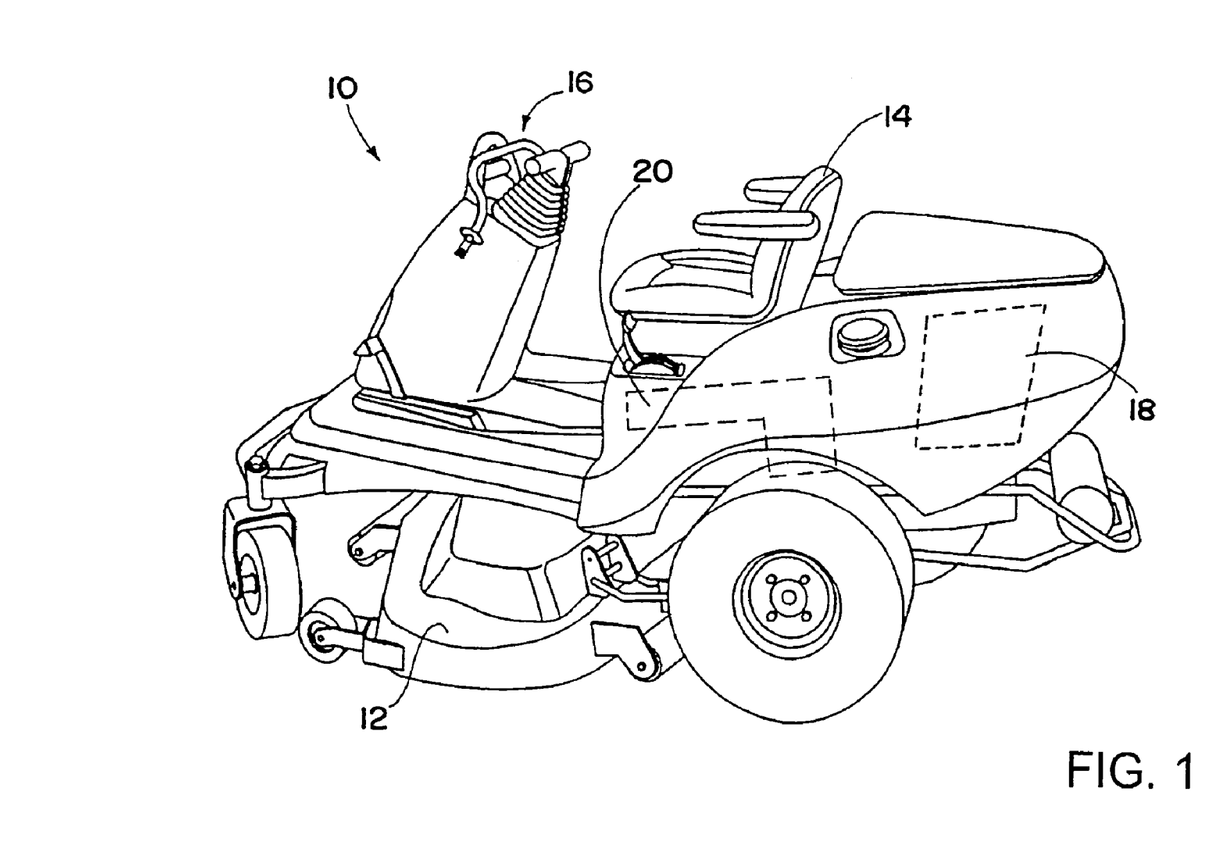
FIG. 1 is a zero-turn-radius mower including an exemplary hydraulic pump unit in accordance with the invention.

Referring now to the drawings in detail, and initially to FIG. 1, an exemplary zero-turn-radius mower 10 is illustrated. The mower 10 includes a mower deck 12 for mowing grass, an operator seat 14, and a plurality of controls 16 for operating the mower 10. A rear-mounted engine 18, which can be an internal combustion engine (prime mover), provides power to a hydraulic pump unit 20 mounted to a frame of the mower 10 under the seat 14. The hydraulic pump unit 20 can be connected to the engine 18 in any suitable manner, such as via a belt and pulley, for example. As described below in greater detail, the hydraulic pump unit 20 includes a pair of pump assemblies for supplying fluid to a pair of hydraulic motors each associated with a respective rear wheel 22.

Figure 2:
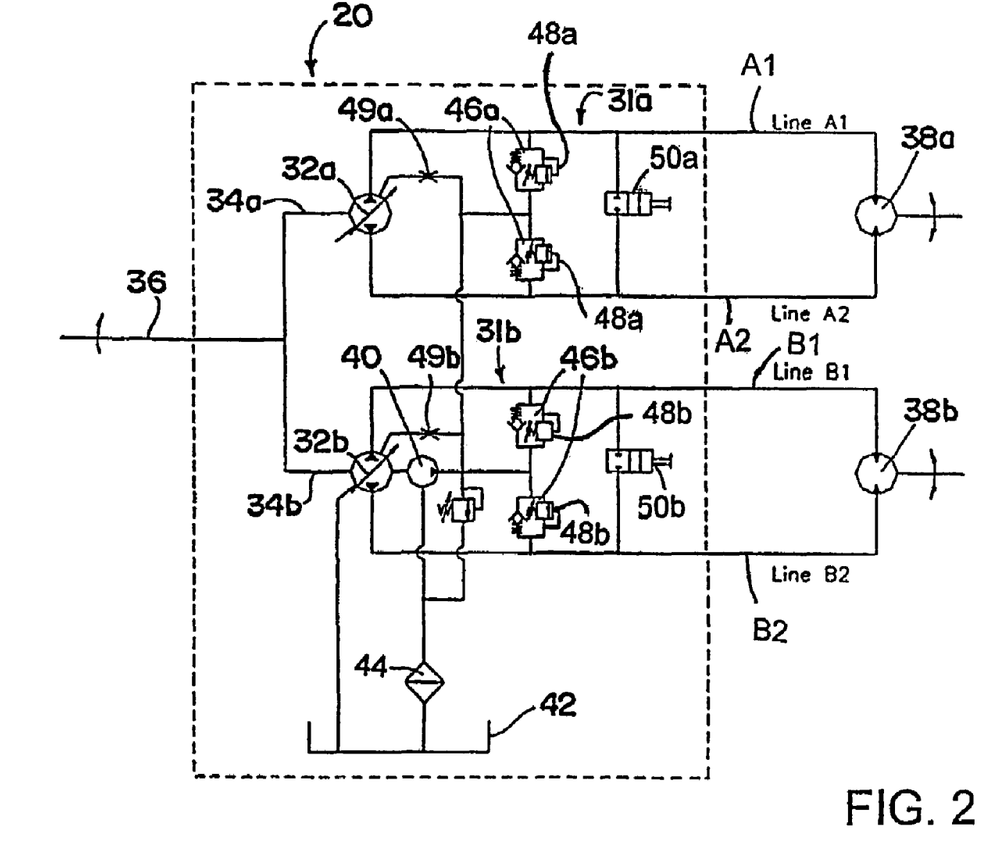
FIG. 2 is a schematic illustration of the hydraulic pump unit.
Figure 3:
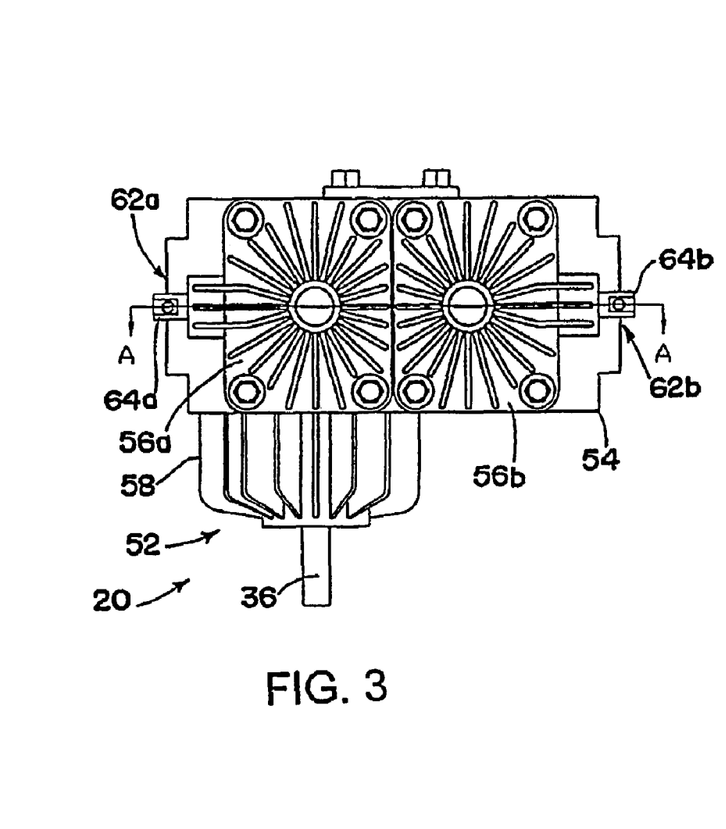
FIG. 3 is a front elevational view of the hydraulic pump unit.
Figure 4:
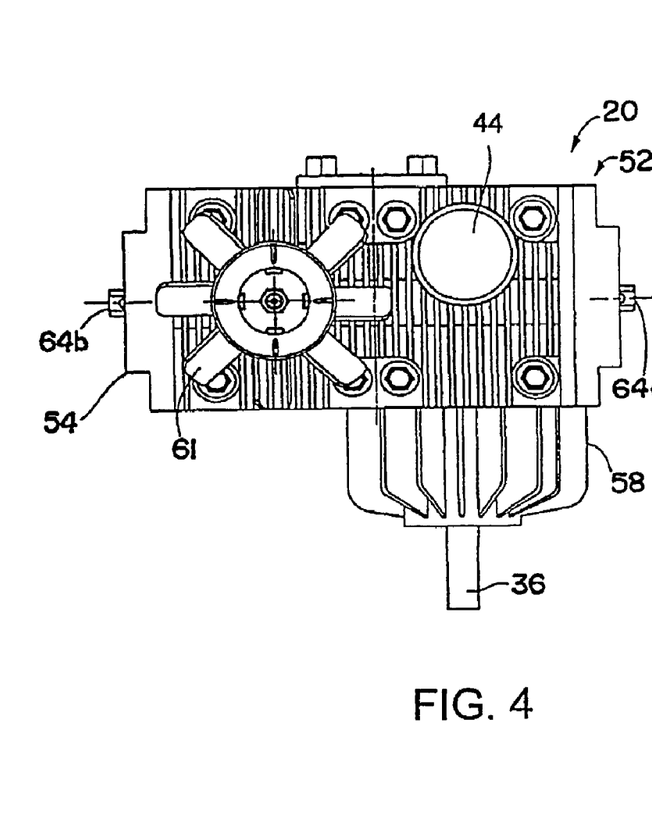
FIG. 4 is a rear elevational view of the hydraulic pump unit.

Turning to FIG. 2, the exemplary hydraulic pump unit 20 has a pair of closed loop hydraulic circuits 31a and 31b each including a pump assembly 32a and 32b. Each pump assembly 32a and 32b has a rotatable pump shaft 34a and 34b driven by an input drive shaft 36 separate from the pump shafts 34a and 34b of each pump assembly 32a and 32b. The input shaft 36 is driven by a prime mover, such as the internal combustion engine 18 in FIG. 1. As will be described in more detail below, transmission components (not shown in FIG. 2) drivingly connect the input shaft 36 to the pump shafts 34a and 34b whereupon rotation of the input drive shaft 36 effects rotation of the pump shafts 34a and 34b for pumping fluid.

Fluid from each pump assembly 32a and 32b is supplied to a pair of motor assemblies 38a and 38b via pressure lines A1 and A2 and B1 and B2. The pump assemblies 32a and 32b can be variable flow reversible pumps, as shown, or any other suitable type of pump for supplying high pressure hydraulic fluid to motor assemblies 38a and 38b. Depending on the operational state of the reversible pump assemblies 32a or 32b, high pressure fluid will be supplied to either line A1 or A2, or B1 or B2, while the other line serves as a return line. Thus, as used herein, the term high pressure supply line should be understood to refer to either line A1 or A2, or line B1 or B2, depending on the direction of flow displacement of the respective pump assembly 32a and 32b.

In the illustrated embodiment, a charge pump 40 is driven by pump shaft 34b. The charge pump 40 is typically a positive displacement pump that is configured to provide makeup flow of relatively cool hydraulic fluid from a sump 42 to pressure lines A1, A2 and/or B1, B2 to account for fluid losses due to leakage from the hydraulic circuits 31a and 31b, and to provide for continuous exchange of fluid between hydraulic circuits 31a and 31b and the sump 42 to prevent overheating of the hydraulic fluid. To this end, the intake of the charge pump 40 is connected to the sump 42 via a filter 44. The output of the charge pump 40 is connected to supply lines A1, A2 via a pair of check valves 46a. Similarly, the output of the charge pump 40 is also connected to supply lines B1 and B2 via a pair of check valves 46b. Pressure relief valves 48a and 48b are provided for relieving pressure from the pressure lines A1, A2 and B1, B2 if the pressure of the fluid in a line exceeds a prescribed amount. The charge pump 40 is also connected to each pump assembly 32a and 32b via a pair of supply lines including orifices 49a and 49b for supplying fluid thereto for reducing pump cavitation.

Each hydraulic circuit also includes a bypass valve 50a and 50b, connected across pressure lines A1 and A2, and B1 and B2, respectively. The bypass valves 50a and 50b provide a short circuit across the inlet and outlet of the motor assemblies 38a and 38b. Accordingly, when open, the bypass valves 50a and 50b permit flow between pressure lines A1 and A2 and B1 and B2. The bypass valves 50a and 50b may be opened to permit free rotation of the motor output shafts as may be desired when the vehicle is being towed or pushed.

The foregoing description of the hydraulic pump circuits 31a and 31b is exemplary in nature, and it will be appreciated that other configurations of the hydraulic circuits 31a and 31b can be used in accordance with the invention.

Figure 5:
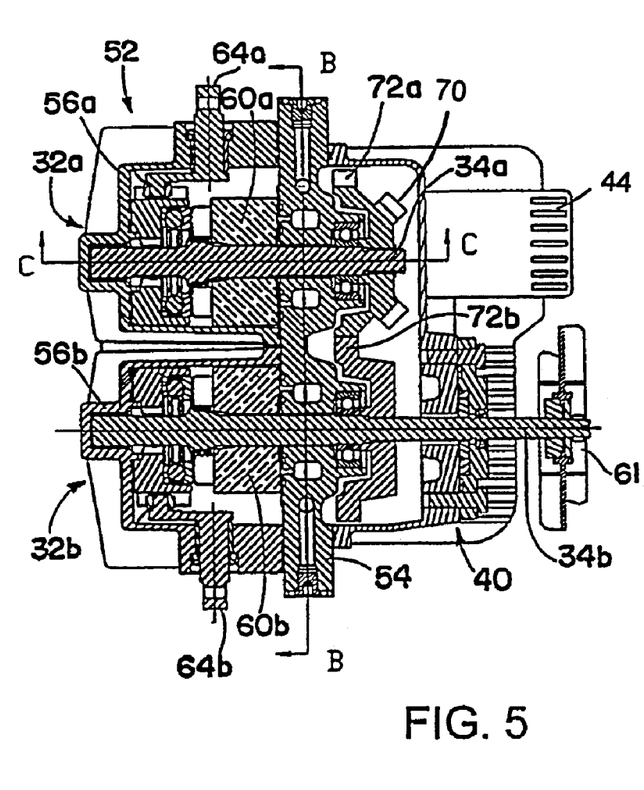
FIG. 5 is a cross-sectional view of the hydraulic pump unit taken along line A-A of FIG. 3.
Figure 6:
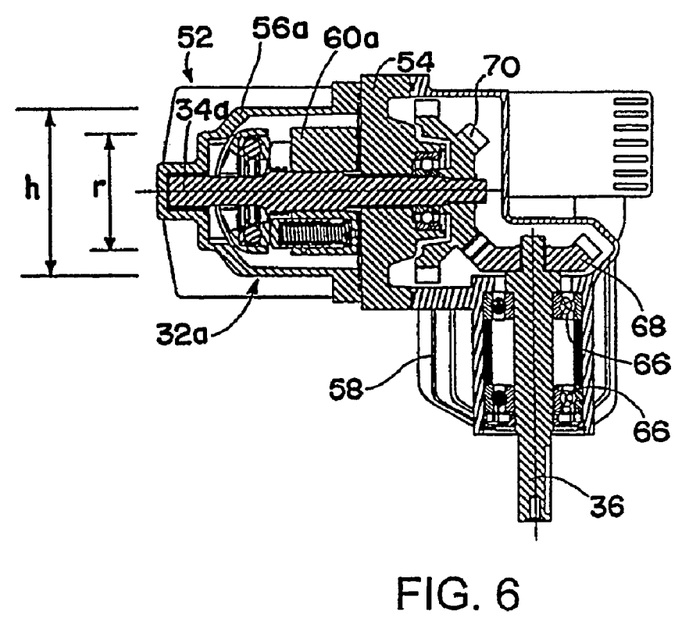
FIG. 6 is a cross-sectional view of the hydraulic pump unit taken along line C-C of FIG. 5.
Figure 7:
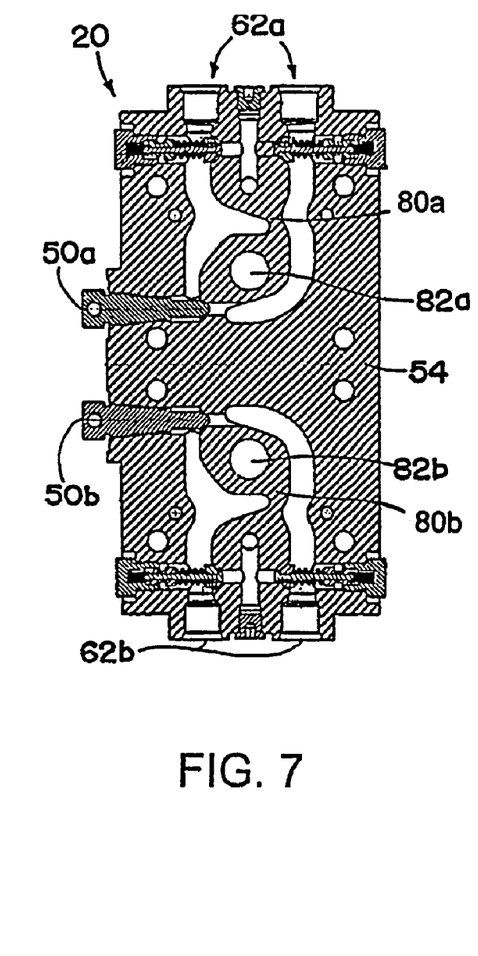
FIG. 7 is a cross-sectional view of the hydraulic pump unit taken along line B-B of FIG. 5.

Turning now to FIGS. 3-7, an exemplary structural arrangement of the hydraulic pump unit 20 is illustrated. The hydraulic pump unit 20 includes a housing 52 including a pump end cap 54 with pump porting, pump covers 56a and 56b, and a lower cover 58 in which the input drive shaft 36 is supported. Each hydraulic pump assembly 32a and 32b (see FIG. 5) is generally contained within respective pump covers 56a and 56b of the housing 52. The hydraulic pump assemblies 32a and 32b include fluid pumping components 60a and 60b mounted to respective pump shafts 34a and 34b for rotation therewith. In the illustrated embodiment, the fluid pumping components 60a and 60b include a barrel with a piston/cylinder arrangement for pumping fluid in a well known manner. The pump assemblies 32a and 32b are mounted such that the rotational axes of pump shafts 34a and 34b are parallel. A cooling fan 61 is mounted to an external projection of the pump shaft 34b outside the housing for circulating air around the housing 52. The input drive shaft 36 is supported in the housing 52 apart from the pump shafts 34a and 34b of each pump assembly 32a and 32b. In the illustrated embodiment, the input drive shaft 36 has a rotational axis perpendicular to the rotational axes of the pump shafts 34a and 34b. Inlet and outlet ports 62a and 62b (see FIG. 7) associated with pump assemblies 32a and 32b, respectively, are located at opposite transverse sides of the housing 52. Trunnion arms 64a and 64b are provided for controlling respective swash plates of pump assemblies 32a and 32b for controlling the flow rate and flow direction of each pump assembly 32a and 32b. An external oil filter 44 is secured to an exterior portion of the housing 52 for filtering the hydraulic fluid. It will be appreciated that the oil filter 44 could instead be an internal oil filter contained within the housing 52. Turning now to FIGS. 5-7, the interior details of the hydraulic pump unit 20 will be described. With reference to FIG. 6, the input drive shaft 36 is supported for rotation within the housing by bearings 66. Transmission components are provided for transmitting rotation of the input shaft 36 to pump shaft 34a. The transmission components include a bevel gear 68 secured to the input drive shaft 36 for rotation therewith and matingly engaged with a bevel gear 70 secured to pump shaft 34a for rotation therewith. Accordingly, rotation of the input drive shaft 36 results in rotation of pump drive shaft 34a. The perpendicular arrangement of the input drive shaft 36 and pump shaft 34a provides two sides of a rectangular space convenient for locating filter 44 while preserving the compact profile of the hydraulic unit 20. Although axes of the input drive shaft 36 and pump shaft 34a in the illustrated embodiment preferably are perpendicular, it will be appreciated that the orientation of the axes could be parallel or any other suitable configuration.

As best seen in FIGS. 5 and 7, the pump shafts 34a and 34b are coupled together such that rotation of one pump shaft results in rotation of the other pump shaft. In this regard, spur gears 72a and 72b are mounted to respective pump shafts 34a and 34b for rotation therewith. The spur gears 72a and 72b can be secured to the pump shafts 34a and 34b in any suitable manner, such as with a key, for example. Bevel gear 70 and spur gear 72a can be formed as a unitary structure as shown, or can be separate structures as desired. As such, it will be appreciated that rotation of the input drive shaft 36 results in rotation of both pump input shafts 34a and 34b.

As mentioned, cooling fan 61 is mounted to pump shaft 34b for rotation therewith. As illustrated, the cooling fan 61 is mounted to a portion of the pump shaft 34b that extends through the housing 52. It will be appreciated that the fan can be configured to force air towards the housing 52 or draw air from around the housing 52 (e.g., push air away from the housing 52), as desired. Pump shaft 34b may also drive charge pump assembly 40 for supplying makeup flow to the hydraulic loops of the pump unit 20.

Turning now to FIG. 7, a pump end cap 54 includes pump mounting surfaces 80a and 80b to which pump assemblies 32a and 32b are mounted. Pump shafts 34a and 34b extend through shaft bores 82a and 82b in the pump end cap 54.

Porting connects the inlet and outlet ports 62a and 62b to pump assemblies 32a and 32b.

Figure 8:
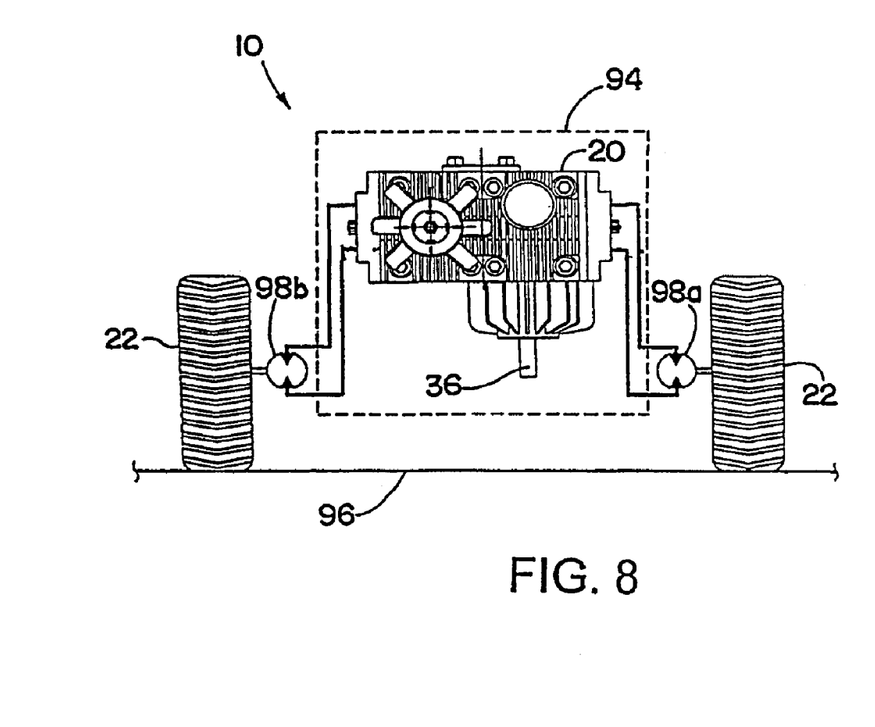
FIG. 8 is a partial schematic illustration of the hydraulic pump unit assembled in the mower.

Turning now to FIG. 8, a partial schematic illustration of the hydraulic pump unit 20 installed in the vehicle 10 is illustrated. The vehicle includes a frame 94 having a longitudinal axis extending into the page, and wheels 22 for supporting the frame 94 for movement over the ground 96. The hydraulic pump unit 20 is mounted to the frame with the rotational axes of the pump shafts 34a and 34b substantially parallel to the longitudinal axis of the frame 94. Inlet and outlet ports 62a and 62b on opposite transverse sides of the end plate housing 52 are adjacent to respective hydraulic motors 98a and 98b. Accordingly, the inlet and outlet ports 62a and 62b are connected to respective motors 90a and 90b for independently driving wheels 22 to move the vehicle over the ground 96. By mounting the hydraulic pump unit 20 in the illustrated orientation, the pump shafts (not shown) extend in the longitudinal direction of the frame 94 while the input drive shaft 36 extends downward from the hydraulic pump unit 20 for connection to a prime mover.

By providing inlet and outlet ports 62a and 62b on opposite transverse sides of the housing 52, the hydraulic pump unit 20 when installed in a vehicle and particularly when installed in a vehicle under a seat, can be connected easily to respective motors for driving wheels on opposite sides of the vehicle. The inlet and outlet ports 62a and 62b are oriented vertically and, depending on the location of respective motors, can be connected thereto using basic fittings, such as straight or right-angle fittings.

Further, a hydraulic pump unit in accordance with the invention has a relatively narrow profile (e.g., height dimension) thereby enabling the unit 20 to be mounted under the seat of smaller vehicles. In this regard, the height dimension h (see FIG. 6) of the portion of the housing 52 surrounding the fluid pumping components 60a and 60b of the pump assemblies 32a and 32b is preferably no more than 50 percent larger than the radial dimension r of the fluid pumping components 60a and 60b, more preferably no more than 35 percent, and still more preferably no more than 25 percent.

Figure 9:
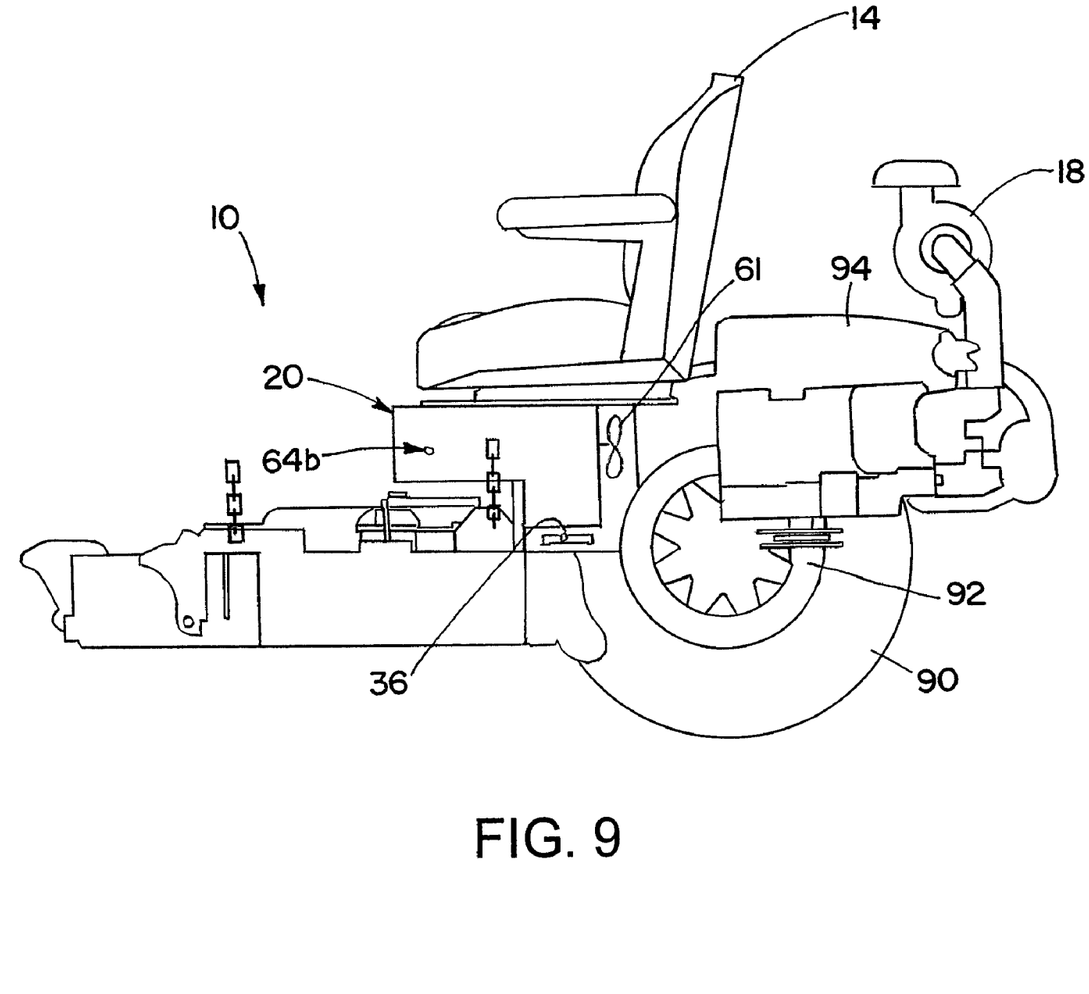
FIG. 9 is a partial schematic illustration of another zero-turn-radius mower including the hydraulic pump unit.
Figure 10:
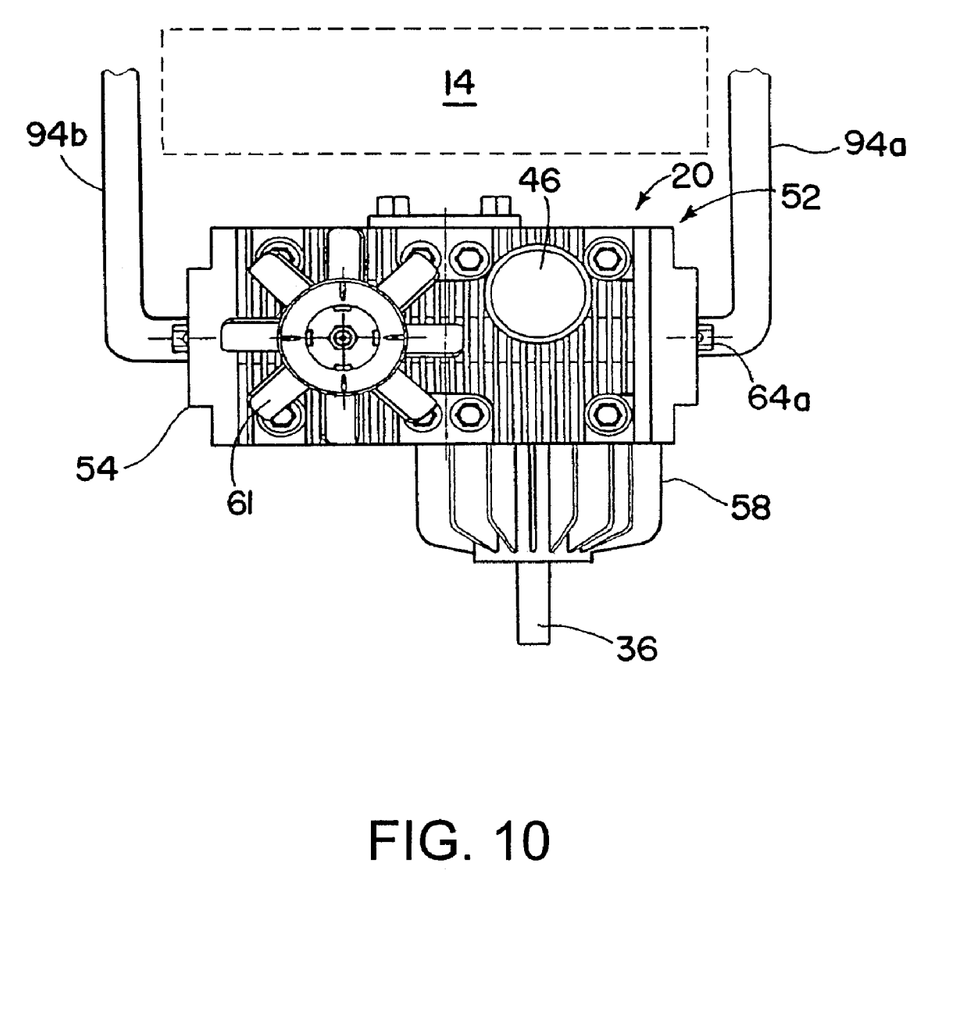
FIG. 10 is a rear elevational view of the hydraulic pump unit having control arms directly connected thereto.

For example, and turning to FIG. 9, another rear-engine mount zero-turn radius mower 10 is schematically illustrated including the hydraulic unit 20 mounted underneath a seat 14. An output shaft 90 of the engine 18 extends downwardly therefrom and a pulley 92 is provided for coupling the output shaft 90 to the input drive shaft 36 of the hydraulic pump unit 20 with a belt or other suitable linkage. The location of the hydraulic pump unit 20 under the seat 14 facilitates the direct connection of control arms 94a and 94b (see FIG. 10) to respective trunnions 64a and 64b of the hydraulic pump unit 20 on respective sides of the mower 10 below the seat 14. The control arms can be moved forward and backward by an operator of the mower 10 to thereby rotate the trunnions 64a and 64b to control flow rate and flow direction of the hydraulic pump assemblies 32a and 32b. The fan 61, which in FIG. 9 is located at the rear of the hydraulic unit 20 between the housing 52 and the engine 18, can be configured to force air towards the housing 52 of the unit 20 or draw air from around the housing 52 (e.g., push air away from the housing 52), as desired. A cooling fan 96 associated with the engine 18 can assist the fan 61 in moving air across the hydraulic pump unit 20.

Accordingly, it will be appreciated that the low profile of the hydraulic unit 20 facilitates a low seat height and a compact mower design with the engine 18 being located in close proximity to the hydraulic unit 20. Thus, the hydraulic pump unit 20 can facilitate a reduction in the overall length of a mower.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic pump unit for a vehicle comprising:
   a housing;
   first and second hydraulic pump assemblies located within the housing and each having a rotatable pump shaft and fluid pumping components driven upon rotation of the pump shaft to pump fluid from a first port to a second port;
   an input drive shaft mounted in the housing apart from the pump shaft of each pump assembly; and
   transmission components drivingly connecting the input shaft to the pump shafts whereupon rotation of the input drive shaft effects rotation of the pump shafts:
   wherein the pump shafts have separate axes that are parallel to one another and transversely spaced apart, and the first and second ports for each pump assembly open to opposite transverse external sides of the housing.

2. A hydraulic pump unit as set forth in claim 1, wherein the pump shafts have rotational axes, and the input drive shaft has a rotational axis perpendicular to the rotational axes of the pump shafts.

3. A hydraulic pump unit as set forth in claim 1, wherein the transmission components include drive components for driving the pump shaft of one pump off the pump shaft of the other pump, and the other pump shaft is driven off the input drive shaft.

4. A hydraulic pump unit as set forth in claim 3, wherein the drive components include a set of spur gears for rotationally coupling the pump shafts such that rotation of one shaft results in rotation of the other shaft.

5. A hydraulic pump unit as set forth in claim 1, wherein the transmission components include a first spur gear on the first pump shaft matingly engaged with a second spur gear on the second pump shaft, and a bevel gear on the input drive shaft matingly engaged with a bevel gear on the second pump shaft, wherein the spur gear and bevel gear on the second pump shaft are formed as a unitary structure.

6. A hydraulic pump unit as set forth in claim 1, wherein the input drive shaft is coupled to at least one of the pump shafts by a bevel gear set.

7. A vehicle comprising a frame having a longitudinal axis and wheels supporting the frame for movement over the ground, and a pump unit according to claim 1 mounted to the frame with the rotational axes of the pump shafts substantially parallel to the longitudinal axis of the frame.

8. A vehicle as set forth in claim 7, wherein the pump shafts of the hydraulic pump unit are parallel to one another and transversely spaced apart, the first and second ports for each pump assembly being located at opposite transverse sides of the housing for connection to respective hydraulic motors on transverse opposing sides of the vehicle for independently driving the wheels of the vehicle.

9. A vehicle as set forth in claim 8, wherein the first and second ports for each pump assembly are located on respective opposite transverse sides of the vehicle.

10. A vehicle as set forth in claim 8, wherein the first and second ports for each pump assembly are arranged in a vertical configuration wherein one port is higher than the other port.

11. A hydraulic pump unit as set forth in claim 1, wherein a height dimension of a portion of the housing surrounding the fluid pumping components of the pump assembly does not exceed a radial dimension of the fluid pumping components by more than 50 percent.

12. A hydraulic pump unit as set forth in claim 1, wherein a height dimension of a portion of the housing surrounding the fluid pumping components of the pump assembly does not exceed a radial dimension of the fluid pumping components by more than 35 percent.

13. A hydraulic pump unit as set forth in claim 1, wherein a height dimension of a portion of the housing surrounding the fluid pumping components of the pump assembly does not exceed a radial dimension of the fluid pumping components by more than 20 percent.

14. A hydraulic pump unit as set forth in claim 1, wherein a height dimension of a portion of the housing surrounding the fluid pumping components of the pump assembly does not exceed six inches.

15. A vehicle comprising a frame having a longitudinal axis and wheels supporting the frame for movement over the ground, and a pump unit mounted to the frame, wherein the pump unit includes a housing, first and second hydraulic pump assemblies located within the housing and each having a rotatable pump shaft and fluid pumping components driven upon rotation of the pump shaft to pump fluid from a first port to a second port an input drive shaft mounted in the housing apart from the pump shaft of each pump assembly, and transmission components drivingly connecting the input shaft to the pump shafts whereupon rotation of the input drive shaft effects rotation of the pump shafts, wherein the pump shafts of the hydraulic pump unit are parallel to one another and transversely spaced apart, the first and second ports for each pump assembly being located at opposite transverse sides of the housing for connection to respective hydraulic motors on transverse opposing sides of the vehicle for independently driving the wheels of the vehicle, wherein the pump unit is mounted to the frame with the rotational axes of the pump shafts substantially parallel to the longitudinal axis of the frame, and further comprising a fan for circulating air around the hydraulic unit, the fan being located between the hydraulic unit and an engine mounted to the vehicle.

* * * * *